BISTABLE TRANSISTOR TRIGGER CIRCUIT

Filed Oct. 25, 1954

| | I | II | III |
|---|---|---|---|
| RV1 | OFF | ON | ON |
| RV2 | ON | ON ↔ OFF | OFF |
| RV3 | ON | ON | OFF |

INVENTOR
R. L. TRENT
BY W. L. Keefauver
ATTORNEY

United States Patent Office 2,843,762

Patented July 15, 1958

2,843,762

BISTABLE TRANSISTOR TRIGGER CIRCUIT

Robert L. Trent, Pluckemin, N. J., assignor to Bell Telephone Laboratories, Incorporated, New York, N. Y., a corporation of New York Application October 25, 1954, Serial No. 464,300

15 Claims. (Cl. 307—88.5)

Figure 1:
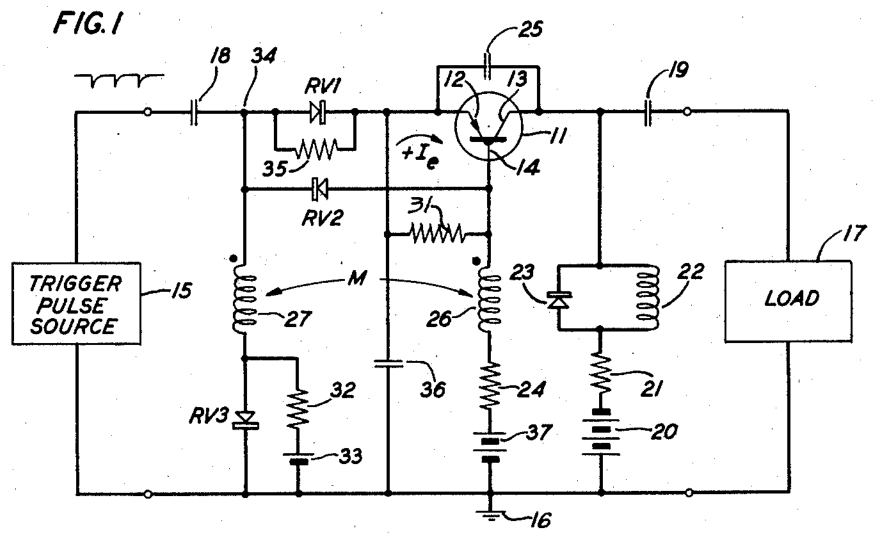

This invention relates to transistor trigger circuits.

Transistors lend themselves readily to trigger circuit applications; and, where alpha, the device current amplification factor, is greater than one, trigger circuits employing but a single transistor are possible. Such circuits may be made monostable, astable, or bistable by proper proportioning of circuit constants. Of the single transistor trigger circuits suggested thus far, the majority employ an impedance connected in series with the base electrode, the value of which is sufficiently large to give rise, by positive feedback, to a region of negative resistance in the input circuit characteristic. Examples of such trigger circuits may be found in the following patents: R. L. Trent 2,629,833, February 24, 1953; A. J. Rack 2,579,336, December 18, 1951; and J. H. Felker 2,670,445, February 23, 1954.

Although it is desirable in many cases to employ but a single transistor as the active element in the trigger circuit, the need for high speed often requires the use of either two transistors or large amounts of "clock" signal power. In fact, single transistor trigger circuits with no "clock" signal to assist in turning the circuit "on" and "off" have heretofore been generally limited to kilocycle operating rates.

A principal object of the present invention is to increase the speed with which a single transistor trigger circuit may be switched either "on" or "off." Related objects are to increase both triggering sensitivity and circuit stability, particularly with variations in either temperature or from transistor to transistor.

In accordance with a specific embodiment of the invention which is described in more detail below for purposes of illustration, the emitter load circuit of a bistable transistor trigger circuit is modified by the use of several diodes to achieve a first stable operating point in the "off" condition which is quite close to the peak turning point and a second stable operating point in the "on" condition which is quite close to the valley turning point of the negative resistance characteristic. By locating the stable operating point in the "on" condition as close to the valley point as feasible, the degree of collector saturation is reduced so that carrier storage effects which have heretofore limited the speed with which such a trigger circuit can be turned "off" are greatly minimized.

Trigger sensitivity is further increased by inductors which are connected in the emitter load circuit and in the base circuit. These inductors may be coupled to increase switching speed. Also, the use of an inductor in the base circuit which has a low static resistance permits the employment of a smaller feedback resistor which renders the circuit less sensitive to fluctuations in $I_{c0}$ either with temperature or from unit to unit.

One feature of the circuit to be described is that high switching speeds are achieved without the use of a "clock" signal and its attendant power requirements.

Figure 2:
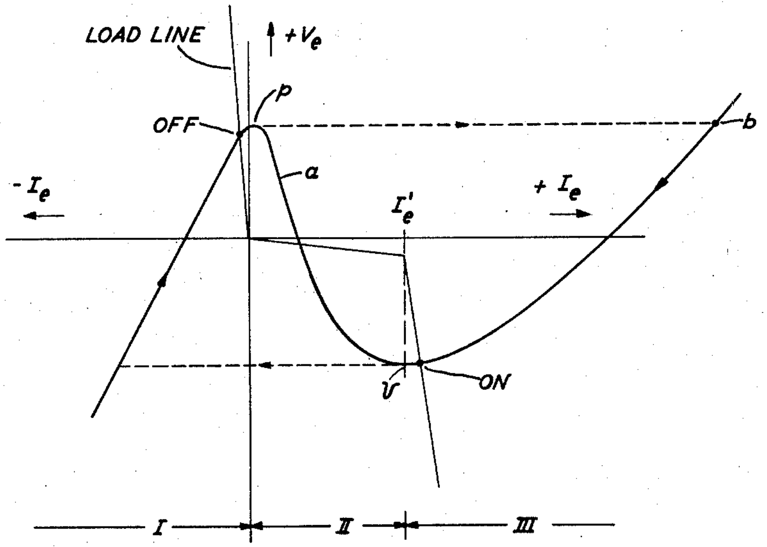

These and other objects and features of the invention may be more fully understood from a consideration of the following detailed description when read in accordance with the attached drawings, in which:

Fig. 1 is a schematic circuit diagram of a bistable single transistor trigger circuit embodying principles of the invention; and Fig. 2 is an emitter voltage versus emitter current characteristic of the trigger circuit illustrated in Fig. 1 and its associated emitter load line.

The trigger circuit illustrated in Fig. 1 employs as its active element a single transistor 11 of the point-contact type having emitter 12, collector 13, and base 14 electrodes. Negative triggering pulses from a trigger pulse source 15 are applied alternately to the emitter 12 and base 14 electrodes by a routing or steering circuit comprising a pair of diodes RV1 and RV2 which, as will be described more fully, steer negative input pulses to the base when the circuit is "off" and to the emitter when the circuit is "on." Diodes RV1 and RV2, as well as diode RV3, may comprise any of the well-known asymmetrically conducting impedance devices such as semiconductor rectifying elements which have low forward resistances of less than a few hundred ohms and high reverse resistances of over a hundred thousand ohms. Output is taken from collector 13 to ground 16 for application to a load circuit 17. Condensers 18 and 19 are coupling condensers. The battery 20 supplies collector current through a load resistor 21 and an inductor 22 shunted by a diode 23 to prevent ringing. The inductor 22 and diode 23 enhance the amplitude of the output pulse.

The input static characteristic of this circuit is illustrated by the emitter voltage-emitter current characteristic, curve *a*, in Fig. 2, in which the voltage shown is from emitter 12 to ground 16. This static characteristic has three regions of primary interest which are designated region I, region II, and region III. Regions I and III represent positive resistances, while region II represents negative resistance. Significant points on the static characteristic are a peak turning point *p* between regions I and II and a valley turning point *v* between regions II and III.

The static negative resistance region is achieved by the resistor 24 connected in series with the base electrode and by the fact that the transistor 11 illustrated is a point-contact unit, a type which generally has an alpha or current amplification factor greater than one over a useful range of emitter and collector currents. The polarities of the emitter and collector currents are such that when the emitter current is increased, the resulting larger increase in collector current is such as to develop a positive feedback voltage across the resistor 24 which causes a further increase in the emitter current and hence the negative resistance characteristic in region II. In the circuit shown, the dynamic positive feedback is enhanced by the condenser 25 connected between the emitter and collector electrodes and by the base inductor 26 which assumes its relatively high dynamic impedance in response to changing currents. Dynamic positive feedback may be further increased by coupling the inductor 26 and the inductor 27 which is connected in the emitter load circuit.

The slope of the static characteristic in region I is decreased by the resistor 31 connected between the emitter and base electrodes. For a given load line, this achieves an "off" intersection of load line and static characteristic *a* closer to the peak turning point than would otherwise be obtained. As described more fully in a copending application of A. E. Anderson, Serial No. 166,733, filed June 7, 1950, which issued May 17, 1955, as Patent No. 2,708,720, this resistor also stabilizes the "off" operating point since $I_{c0}$ variations will vary both the emitter-to-ground and base-to-ground potentials and hold the emitter-to-base potential substantially constant.

If the branch circuit shunting the input which includes the coil 27, the diode RV3, resistor 32, and battery 33 were replaced by a series resistor and battery such as the resistor 32 and battery 33, the load line of the circuit would be a straight line which would intersect the emitter characteristic at a point or points depending on the value of the resistor and the magnitude of the bias supplied by the battery. Since triggering is achieved either by effectively raising the load line or depressing the circuit characteristic so that either the peak turning point or valley turning point are exceeded, it can readily be seen that the use of a resistive load line does not give the circuit designer much flexibility in establishing stable operating points. This, in fact, has previously been realized; and in several copending applications, B. Ostendorf, Jr., Serial No. 292,875, filed June 11, 1952, and J. H. Felker, Serial No. 376,923, filed August 27, 1953, circuitry employing biased diodes is shown for effecting "broken" load lines which can be caused to obtain desired intersections of load line and circuit characteristic.

Applicant, however, has simplified the circuitry required to achieve a broken load line in a bistable circuit while including pulse routing features in the circuit design so that the circuit may be triggered by input pulses of the same polarity. Further, applicant has traced a cause of delay in switching to carrier storage effects and has been able to increase switching speed substantially by causing the load line to intersect the circuit characteristic in such a manner that these effects are substantially reduced.

The delay due to carrier storage arises from saturation effects in the "on" condition. These carriers are injected into the base region of the semiconductor body when the circuit is "on" and increase in number as the ratio of emitter current to collector current is increased. When a pulse is applied to the transistor to turn it "off," these carriers ar released as a current and may retard turning off by producing a trailing edge on the output pulse. In some cases, the number of stored carriers may be so great that the input pulse is unable to turn the circuit "off."

In accordance with the principles of the invention, applicant has avoided this delay by causing the load line to intersect the circuit characteristic in region III as close as possible to the valley turning point *v*. This reduces the ratio of emitter current to collector current in the "on" region so that stored carriers and their adverse effects are minimized.

A circuit embodying principles of the present invention will now be described. The emitter load circuit includes a first diode RV3 poled for easy current flow in the direction opposite to the flow of positive emitter current, $+I_e$. A positive bias current, also opposing positive emitter current flow, is applied to diode RV3 by battery 33 through a resistor 32. The positive bias applied to the diode by the battery 33 is of such value as to maintain this diode conducting, or "on," for all values of emitter current less than $I_e'$, where $I_e'$ coincides as closely as possible with the valley point in the static characteristic. While conducting, this diode represents a very small resistance. A second diode RV1 is connected in series with the input circuit by which input trigger pulses are applied to the emitter electrode. In the emitter-base circuit, diode RV1 is oppositely poled with respect to diode RV3. Further, diode RV1 is biased "off" by the difference in potential between the emitter electrode 12 and point 34 for negative emitter currents and in its low resistance conducting condition, or "on," for all emitter currents greater than $I_e=0$. In other words, the conducting condition of RV1 is determined by the polarity of the emitter current. In the intermediate region, region II, both diodes RV1 and RV3 are biased in their low resistance condition.

The effects of these two diodes and their associated biases may be understood by referring to the load line which is superimposed on the emitter characteristic in Fig. 2 and by the table immediately below the curves which indicates the conducting and hence resistance conditions of the various diodes in the three regions of interest. In region I, the diode RV1 is biased in its high resistance condition or "off," while the diode RV3 is biased in its low resistance condition or "on." Therefore, the load line in this region has a slope substantially equal to the high reverse resistance of the diode RV1 as modified by the shunt resistor 35. This resistor is proportioned, in combination with the reverse resistance of diode RV1, to achieve an intersection of load line and circuit characteristic in the "off" region which is as close to the peak turning point *p* as is possible under expected operating variations which may result in a drift of either load line or circuit characteristic. Further, by effectively reducing the reverse resistance of the diode, the resistor 35 permits the condenser 36 to discharge more quickly in the "off" region and thereby achieve stability more quickly in this region.

The section of the load line in the "off" region intersects the origin since the point 34 in this region is substantially at ground potential, assuming the D.-C. resistance of the coil 27 and the forward resistance of the diode RV3 to be negligible. This is made possible by the battery 37 in the base circuit which elevates the circuit characteristic into the positive voltage region.

To obtain the most rapid transition from "off" to "on," or vice versa, both diodes RV1 and RV3 are biased "on" in region II, so that the load line in region II has a very shallow slope substantially equal to the D.-C. resistance of the coil 27 plus the low forward impedance of diode RV3. The circuit will thus snap rapidly from the peak turning point *p* to point *b* along a constant voltage line due to the condenser 36 which holds its charge during this interval. As soon as the circuit begins to trigger "on," positive emitter current, $+I_e$, will begin to flow in the emitter-base circuit in a direction indicated on the drawing which opposes the biasing current applied to the diode RV3 by battery 33. Diode RV1 will become a low impedance when the emitter current becomes positive, and diode RV3 will become a high impedance when the emitter current flowing through it exceeds the battery 33 bias current. When diode RV3 is a high resistance, i. e., in region III, the load line resistance is effectively the value of resistor 32, which is small-valued relative to the high reverse resistance of diode RV3. The circuit will eventually reach equilibrium at the "on" intersection in region III of the load line and circuit characteristic.

A stable intersection in the "on" condition between load line and input characteristic is thus obtained which, by design, may be made to approach the valley point *v* as close as stability requirements and temperature variation in the current gain factor will allow. This will minimize carrier storage effects so that the circuit may then be turned "off" by small pulses again applied between emitter and base, which, although having the same polarity at the input terminals, will have the opposite polarity with respect to emitter and base from those which turned the circuit "on" due to the steering circuit, to be described.

Diodes RV1 and RV2 act to steer the negative input pulses to the proper electrode to effect switching either from "off" to "on" or from "on" to "off." (A steering diode similar to RV2 is shown in J. T. Bangert Patent 2,595,208, dated April 29, 1952.) The static potentials and pulse polarity are utilized to obtain steering action. When the transistor is "off," the diode RV1 in series with the emitter is also "off," or non-conducting, but due to the potential of the base electrode which is positive with respect to the emitter, the diode RV2 will be conducting. A negative trigger pulse will thus be steered to the base electrode and, at the same time, will increase the negative bias on diode RV1. It will also cause the peak point $p$ in the circuit characteristic to be depressed by an amount sufficient to cause the circuit to trigger. The condenser 36 will hold the emitter potential fairly constant during this interval until the circuit becomes unstable and triggers. The triggering pulse duration should be fairly short since, as long as this pulse persists, the diode RV1 is maintained non-conducting. Under these conditions, the emitter-to-base resistor 31 and diode shunting resistor 35 are not low enough in value to permit sufficient current to be passed to the emitter to obtain D.-C. stability in the "on" region, region III. The emitter capacitor 36 and emitter-collector capacitor 25 supply the initial triggering current on switching. This need for short triggering pulses does not impose any undue restrictions on the usefulness of the circuit since, if operation at megacycle rates is desired, the trigger pulse duration will necessarily be much shorter than the repetition rate.

As soon as the trigger pulse trails off, diode RV1 is biased in its low impedance conducting condition, and a stable operating point in the "on" region is maintained.

The next negative trigger pulse will be passed to the emitter since, when the trigger circuit is "on," the emitter series diode RV1 is conducting and the base coupling diode RV2 is non-conducting. The emitter load line will be depressed and the emitter current decreased until either the valley point characteristic is exceeded or the emitter series diode RV1 becomes non-conducting. In either case, the circuit will be unable to maintain stable equilibrium and will be triggered to the "off" condition.

Diode RV1, therefore, performs the dual functions of achieving a desired stable operating point in the "off" region and also assisting in the steering of input pulses to either emitter or base to effect triggering.

A small-valued inductor 27 with a low D.-C. resistance is included in series with the emitter load circuit to present a relatively high dynamic shunt impedance to the trigger pulse path when the transistor is "off." In this condition, the emitter load diode RV3 is conducting and would otherwise shunt the trigger source 15 with a low impedance. As soon as a trigger pulse is applied, however, the coil assumes its high dynamic impedance and prevents this loading of the trigger pulse source.

The small-valued inductor 26 in the base circuit acts in a similar fashion to provide a high shunt impedance to the trigger pulse path when it is desired that the pulse be impressed on the base electrode with respect to the emitter. This inductor also enables the use of a relatively small-valued base resistor 24, in fact, one just sufficiently large to maintain D.-C. stability in the "on" region. Since the coil 26 has a low D.-C. resistance, drift due to variations in $I_{c0}$ either with temperature or from unit to unit is minimized. $I_{c0}$ flows through the total base impedance so that smaller values of D.-C. base resistance will achieve smaller variations, percentagewise, in the base voltage as $I_{c0}$ varies.

As indicated above, the coils 26 and 27 may be coupled to provide additional dynamic feedback to further increase switching speed.

The following circuit values were employed to achieve a 2.5-megacycle operating rate with an M1734-type transistor and with Hughes type HD2101 diodes:

| | |
|---|---|
| Resistor **21** | 750 ohms. |
| Resistor **24** | 1500 ohms. |
| Resistor **31** | 6800 ohms. |
| Resistor **32** | 1500 ohms. |
| Resistor **35** | 12,000 ohms. |
| Inductor **22** | 15 microhenries (<0.2 ohm). |
| Inductor **26** | 15 microhenries (<0.2 ohm). |
| Inductor **27** | 15 microhenries (<0.2 ohm). |
| Condenser **18** | 500 micromicrofarads. |
| Condenser **19** | 500 micromicrofarads. |
| Condenser **25** | 47 micromicrofarads. |
| Condenser **36** | 69 micromicrofarads. |
| Battery **20** | −6.3 volts. |
| Battery **33** | +2.0 volts. |
| Battery **37** | +5.0 volts. |

The circuit shown may be modified by employing characteristic modifying circuits disclosed in Patent 2,629,833 issued to me on February 24, 1953. For example, a biased diode may be included in the collector supply circuit as shown in Fig. 7 of this patent to increase the characteristic slope in region III. This will define the valley point $v$ more sharply and will make it relatively independent of alpha, which may vary from transistor to transistor, since the characteristic will then break at a point depending on collector current instead of on alpha. The slope in region III may be further increased by including a biased diode in the base circuit in addition to one in the collector circuit, as shown in Fig. 9 of the same patent. Alternatively, a biased diode may be included in the base circuit and not in the collector circuit. In any event, the location of the valley point may be determined with greater accuracy so that the stable intersection in the "on" region can, with more certainty, be located at the optimum possible ratio of $I_e/I_c$ to reduce carrier storage effects.

Although the invention has been described as relating to a specific embodiment with illustrative values cited, the invention should not be deemed limited to the embodiment shown, which is intended to be illustrative rather than restrictive, since other embodiments and modifications will readily occur to one skilled in the art.

What is claimed is:

1. A bistable circuit comprising a transistor having emitter, collector, and base electrodes, a positive feedback circuit coupling said collector and said emitter and giving said circuit a static characteristic having a peak turning point and a valley turning point between which lies a negative resistance region, a source of pulses of one polarity only, a first circuit for applying pulses from said source to said emitter comprising a first asymmetrically conducting impedance device connected between said source and said emitter, a second circuit branching from said first circuit for applying pulses from said source to said base comprising a second asymmetrically conducting impedance device connected between said source and said base, said first and second asymmetrically conducting impedance devices being oppositely poled with respect to said source, a direct current path interconnecting said emitter and base electrodes and including said first asymmetrically conducting impedance device and a third asymmetrically conducting impedance device oppositely poled in said path from said first asymmetrically conducting impedance device, and means for deriving output pulses from said collector electrode.

2. The combination in accordance with claim 1 and means for biasing said third asymmetrically conducting impedance device in the low impedance condition for emitter currents less than the emitter current in the vicinity of said valley point and in its high impedance condition for emitter currents greater than the emitter current in the vicinity of said valley point.

3. The combination in accordance with claim 2 wherein said biasing means comprise a battery in series with a resistor connected in parallel with said third asymmetrically conducting impedance device, said resistor having a value to limit the emitter current when said trigger circuit is "on" to a value approximately equal to said emitter current in the vicinity of said valley point.

4. The combination in accordance with claim 1 and a first inductive impedance element in series with said third asymmetrically conducting impedance device and a second inductive impedance element in series with said base electrode.

5. The combination in accordance with claim 4 and means for coupling said inductive impedance elements in a positive feedback manner.

6. The combination in accordance with claim 1 and a resistor in parallel with said first asymmetrically conducting impedance device having a value to provide a stable "off" operating point very close to said peak turning point.

7. A bistable trigger circuit comprising a transistor having emitter, collector, and base electrodes, a positive feedback circuit intercoupling a collector-base circuit with an emitter-base circuit, said trigger circuit thereby having an emitter voltage versus current characteristic including a negative resistance region bounded by a peak turning point near zero emitter current and a valley turning point arising from collector current saturation, a first two-terminal asymmetrically conducting impedance device connected in series with said emitter and poled for easy current flow in the direction of positive emitter current flow, a second two-terminal asymmetrically conducting impedance device connected by one terminal to the electrode of said first asymmetrically conducting impedance device remote from said emitter and by its other terminal to said base, a source of trigger pulses all of the same polarity, a circuit for applying pulses from said source to the junction of said first and second asymmetrically conducting impedance devices, a direct current emitter-base circuit including a branch circuit connected in shunt with said pulse applying circuit, said branch circuit including a third asymmertically conducting impedance device poled for easy current flow in the direction opposite to the flow of positive emitter current and a biasing circuit connected in shunt with said third asymmetrically conducting impedance device comprising a resistor in series with a source of direct current, said source poled to apply a forward bias to said third asymmetrically conducting impedance device.

8. The combination in accordance with claim 7 wherein said biasing circuit comprises said resistor and means comprising a source of direct current connected in series with said resistor for biasing said third asymmetrically conducting impedance device "on" for emitter currents less than the emitter current in the vicinity of said valley point and "off" for emitter currents greater than said valley point emitter current.

9. The combination in accordance with claim 7 wherein said resistor has a value to establish a stable operating point at a value of emitter current substantially equal to the emitter current at said valley turning point.

10. The combination in accordance with claim 7 and means to prevent loading of said trigger pulse source comprising a first inductor in said branch circuit and a second inductor in series with said base electrode.

11. A bistable trigger circuit comprising a single transistor having emitter, collector, and base electrodes, said circuit having a characteristic including a negative resistance region bounded by positive resistance regions and a peak turning point at a low value of emitter current and a valley turning point at a higher value of emitter current, a direct current path interconnecting said emitter and base electrodes and including a pair of oppositely poled asymmetrically conducting impedance devices, one of said asymmetrically conducting impedance devices poled for easy current flow in the direction of positive emitter current, means for biasing the other of said asymmetrically conducting impedance devices in its low resistance condition for emitter currents less than the emitter current at said valley point and in its high resistance condition for currents substantially equal to and greater than said valley point, and a resistor connected in shunt with said other asymmetrically conducting impedance device and having a value to establish a stable operating point near said valley turning point at which the ratio of emitter-to-collector current is very nearly equal to the ratio of emitter-to-collector current at said valley point.

12. The combination in accordance with claim 11 and a source of trigger pulses and means for applying said trigger pulses to the junction of said asymmetrically conducting impedance devices.

13. The combination in accordance with claim 11 and a source of trigger pulses all of the same polarity, and a steering circuit for routing pulses from said source alternately to said emitter and base electrodes, said steering circuit comprising said one asymmetrically conducting impedance device and a third asymmetrically conducting impedance device connected between the junction of said pair of asymmetrically conducting impedance devices and said base electrode and oppositely poled from said one asymmetrically conducting impedance device with respect to said source.

14. The combination in accordance with claim 13 and means for reducing loading on said source during triggering intervals comprising a first inductor between the junction of said pair of asymmetrically conducting impedance devices and said other asymmetrically conducting impedance device and a second inductor connected in series with said base electrode.

15. The combination in accordance with claim 13 and means for coupling said inductors in a positive feedback manner.

References Cited in the file of this patent

UNITED STATES PATENTS

| | | |
|---|---|---|
| 2,533,001 | Eberhard | Dec. 5, 1950 |
| 2,629,834 | Trent | Feb. 24, 1953 |
| 2,660,624 | Bergson | Nov. 24, 1953 |
| 2,670,445 | Felker | Feb. 23, 1954 |
| 2,724,061 | Emery | Nov. 15, 1955 |
| 2,745,012 | Felker | May 8, 1956 |